(12) United States Patent
Dunesme et al.

(10) Patent No.: US 8,946,963 B2
(45) Date of Patent: Feb. 3, 2015

(54) POLYPHASE STATOR FOR INTERNALLY VENTILATED ROTATING ELECTRICAL MACHINE, AND ROTATING ELECTRICAL MACHINE COMPRISING SUCH STATOR

(75) Inventors: Xavier Dunesme, Yerres (FR); Jerome Fournier, Boulogne sur Mer (FR); Nicolas Langlard, Loos (FR); Pierre Faverolle, Montgeron (FR)

(73) Assignee: Valeo Equipments Electriques Moteur, Creteil Cedex (FR)

( * ) Notice: Subject to any disclaimer, the term of this patent is extended or adjusted under 35 U.S.C. 154(b) by 650 days.

(21) Appl. No.: 12/668,525

(22) PCT Filed: Jul. 4, 2008

(86) PCT No.: PCT/FR2008/051244
§ 371 (c)(1),
(2), (4) Date: Jul. 20, 2010

(87) PCT Pub. No.: WO2009/010671
PCT Pub. Date: Jan. 22, 2009

(65) Prior Publication Data
US 2010/0295393 A1    Nov. 25, 2010

(30) Foreign Application Priority Data
Jul. 11, 2007   (FR) ..................................... 07 56432

(51) Int. Cl.
*H02K 3/28* (2006.01)
*H02K 1/00* (2006.01)
(Continued)

(52) U.S. Cl.
CPC .. *H02K 3/28* (2013.01); *H02K 9/06* (2013.01); *H02K 11/048* (2013.01)

USPC ............. 310/201; 310/71; 310/195; 310/207; 310/260

(58) Field of Classification Search
CPC .......... H02K 3/28; H02K 9/06; H02K 11/048
USPC ............................ 310/71, 195, 201, 260, 207
IPC .............. H02K 1/00, 3/00, 17/00, 19/00, 21/00, H02K 23/26, 27/02, 3/28
See application file for complete search history.

(56) References Cited

U.S. PATENT DOCUMENTS 6,051,906 A * 4/2000 Umeda et al. ................. 310/179
6,059,969 A * 5/2000 Mizutani ....................... 210/263
(Continued)

FOREIGN PATENT DOCUMENTS

DE    102005061892 A1    6/2007
EP         1220419 A2    7/2002
(Continued)

*Primary Examiner* — John K Kim
(74) *Attorney, Agent, or Firm* — Berenato & White, LLC

(57) ABSTRACT

A polyphase stator for an internally ventilated rotating electrical machine comprises a body (14) provided with slots and carrying a coil (12) having at least one winding per phase. A plurality of pairs of lateral branches are mounted in a slot of the body (14). A plurality of connecting heads (50 to 55) extend outside the body (14) so as to form a first lead-out (42) and interconnect each pair of lateral branches. A plurality of coupling feet (150 to 155) are offset circumferentially with respect to the plurality of connecting heads and extend outside the body (14) so as to form a second lead-out (43) and interconnect each pair of lateral branches. One of the pluralities has a generally pointed shape and has an axial length of between 15 and 20 mm. The stator is used with an alternator or alternator-stator for a motor vehicle. An internally ventilated electrical machine is equipped with the stator.

20 Claims, 6 Drawing Sheets

(51) Int. Cl.
  *H02K 17/00* (2006.01)
  *H02K 19/00* (2006.01)
  *H02K 21/00* (2006.01)
  *H02K 23/26* (2006.01)
  *H02K 27/02* (2006.01)
  *H02K 9/06* (2006.01)
  *H02K 11/04* (2006.01)

(56) References Cited

U.S. PATENT DOCUMENTS

| | | | |
|---|---|---|---|
| 6,201,332 B1 * | 3/2001 | Umeda et al. | 310/184 |
| 6,501,205 B1 * | 12/2002 | Asao et al. | 310/184 |
| 6,851,175 B2 * | 2/2005 | Brown et al. | 29/596 |
| 6,882,076 B2 * | 4/2005 | Masegi et al. | 310/201 |
| 6,943,477 B1 | 9/2005 | Nakamura | |
| 7,075,206 B1 | 7/2006 | Chen | |
| 2002/0030417 A1 * | 3/2002 | Asao | 310/201 |
| 2002/0057971 A1 * | 5/2002 | Shida et al. | 417/410.1 |
| 2003/0048032 A1 * | 3/2003 | Brown et al. | 310/254 |
| 2003/0122441 A1 * | 7/2003 | Masegi et al. | 310/208 |
| 2004/0117925 A1 * | 6/2004 | Lee | 12/142 F |
| 2004/0117975 A1 * | 6/2004 | Nakamura | 29/596 |
| 2005/0110360 A1 * | 5/2005 | Neet et al. | 310/208 |
| 2007/0170804 A1 * | 7/2007 | Baumann | 310/179 |
| 2007/0200448 A1 * | 8/2007 | Oowatari et al. | 310/179 |
| 2008/0036331 A1 * | 2/2008 | Mizutani et al. | 310/269 |
| 2010/0295393 A1 * | 11/2010 | Dunesme et al. | 310/71 |

FOREIGN PATENT DOCUMENTS

| | | |
|---|---|---|
| FR | 2847739 A1 | 5/2004 |
| WO | WO 9206527 A1 | 4/1992 |

* cited by examiner

POLYPHASE STATOR FOR INTERNALLY VENTILATED ROTATING ELECTRICAL MACHINE, AND ROTATING ELECTRICAL MACHINE COMPRISING SUCH STATOR

FIELD OF THE INVENTION

The present invention relates to a polyphase stator for an internally ventilated rotating electrical machine, and in particular to an alternator or alternator-starter of a motor vehicle.

The present invention also relates to an internally ventilated rotating electrical machine comprising such a stator.

STATE OF THE ART

A polyphase stator and an internally ventilated machine of this type are described in FIG. 1, which is a half view in axial cross-section of an internally ventilated polyphase alternator for a motor vehicle with a thermal engine, as for example in document EP 0 515 259, to which reference will be made.

The alternator comprises a housing containing a stator 13 which surrounds a rotor 4 with an annular form, in this case with claws, which is integral with a shaft 2 which is fitted such as to rotate in the housing. The axis of the shaft 2 constitutes the axis of rotation of the polyphase alternator.

The housing comprises at least one metal front bearing 15 and one metal rear bearing 16, which each support centrally a roller bearing, respectively 17 and 18, for rotary fitting of the shaft 2 of the rotor 4.

The bearings are assembled to one another for example by means of tie rods such as those which can be seen in FIG. 1 of document EP 0 515 229, which also shows the lugs for securing the housing to a fixed part of the vehicle.

The rotor 4 comprises two polar wheels 6, 7 with claws, which in this case are made of ferromagnetic steel, and an excitation coil 5 which is fitted between the wheels 6, 7. In this case, the shaft 2 is assembled with the polar wheels 6, 7 by being forced on. This shaft 2 has knurled portions for this purpose.

The stator comprises a body 14 in the form of a set of plates, each comprising a plurality of slots which correspond to one another. This body 14, which in this case has an annular form, supports a polyphase stator coil 12 which passes through the body 14 by means of the slots in the latter, and projects from both sides of the body 14 in order to form first and second coil ends which are known as lead-outs.

The coil 12 comprises conductor segments, and as a variant is in the form of a continuous wire. These conductors have a core made of electrically conductive material, which is generally copper, or as a variant aluminium, covered by at least one electrically insulating layer such as enamel. An electrical insulator is provided for each slot in order to isolate the coil 12 electrically from the body 14, and in order to avoid damaging the insulating layer of the coil 12 when the latter is fitted in the slots in the body 14.

The coil 12 comprises a plurality of windings. This number depends on the number of phases of the alternator, and thus of the stator.

Each phase of the stator comprises at least one winding.

The ends of the coil 5 of the rotor are connected by wired connections to collector rings (for which no reference is given), which are integral with the rear end of the shaft 2, and belong to a collector 3. Brushes (for which no reference is given) can rub on the rings. These brushes are supported by a brush holder 10 (shown partially in FIG. 1) which is integral with a voltage regulator.

In another embodiment, the excitation winding 5 is fixed, the alternator being without brushes and without a collector ring.

The front end of the shaft 2 supports a drive unit 1 which belongs to a drive for movement between the shaft 2 and the crankshaft of the thermal engine of the vehicle. In this case, this unit 1 consists of a pulley which belongs to a movement drive comprising at least one belt which operates between two pulleys. As a variant, the drive is by means of chains or gears. The ends of the windings of the stator phases are connected to a current rectifier device 11. A protective cover (for which no reference is given) covers the rectifier device and is integral with the rear bearing. The cover and the bearings 15, 16 are in this case perforated for circulation of a cooling fluid, such as air, inside the machine housing. In FIG. 1 arrows show the path of the cooling fluid, which in this case is air, inside the alternator and through the different openings for intake of air and output of air of the bearings 15, 16. This circulation of air makes it possible to cool the lead-outs of the coil 12 of the stator 13, as well as the current rectifier device 11 and the voltage regulator.

In this case, the bearings 15, 16 have a hollow form, and each comprise a base, with orientation which is generally transverse relative to the axis of the shaft 2. This base is extended at its outer periphery by a shoulder with orientation which is generally axial relative to the axis of the shaft 2. The base of the rear bearing 16, and in this case also of the front bearing 15, comprises openings for intake of air, one of which can be seen in FIG. 1. These openings have a generally trapezoidal form. The shoulders of the bearings 15, 16 have air output openings. These openings have axially an oblong form, and are also contained in the outer periphery of the base of the bearing concerned, for reasons of removal from the mould, with the bearings 15, 16 having an aluminium basis for example. This circulation of the air is obtained by means of at least one fan. According to one embodiment, this fan is a fan of the centrifugal type which is integral with the rotor. This fan comprises projecting blades which are integral with a flange which is secured to the rotor, for example by means of spot welding.

In this case, the rotor 4 supports at each of its axial ends respectively a front fan 8 and a rear fan 9, which is more powerful than the front fan 8 because it must cool the current rectifier device 11, as well as the voltage regulator. As a variant, this rear fan comprises two superimposed fans in order to increase the number of blades.

As is known, when the excitation coil 5 of the rotor 4 is supplied electrically, and the rotor shaft is rotating, the rotor is magnetised, and an induced alternating current is generated in the winding 12 of the stator 13.

This induced current is rectified into a direct current by the rectifier device 11, in particular in order to recharge the battery of the vehicle and supply the consumers of the on-board network of the vehicle with direct current.

The circulation of air which is generated by the rotation of the fan(s) makes it possible to cool the rectifier device 11 as well as the coil 12 of the stator 13. The current rectifier device 11 is supported by the base of the rear bearing, and in this case comprises diodes which are fitted head to tail, the number of which depends on the number of windings of the coil 12.

In this case, this device 11 consists of a rectifier bridge which comprises:
  a plurality of positive diodes which are supported by a positive metal support, which is designed to be connected to the positive terminal of the battery;

a plurality of negative diodes which are supported by the base of the rear bearing which is connected to the earth; and a connector in order to connect the tails of the diodes to the outputs of the phases of the stator, and to insulate the positive support in relation to the rear bearing.

The connector comprises a body made of plastic material, in which there are embedded tracks for the connections with the diodes, for formation of the arms of the bridge.

As a variant, the device 11 comprises transistors of the MOSFET type, in particular when the alternator is reversible and also functions in electric motor mode, in particular in order to start the thermal engine of the vehicle.

This reversible alternator is known as an alternator-starter. For further details reference can be made for example to document FR 2 745 445.

The polar wheels 6, 7 of the rotor 4 each comprise, as in document EP 0 515 259 and as can be seen in FIG. 2 which is a perspective view of the rotor 4, a flange 22 with transverse orientation which bears claws on its outer periphery. Each claw comprises on its inner periphery a transverse part 20 for attachment to the flange 22, and on its outer periphery it comprises teeth 19 with axial orientation and a trapezoidal form. The teeth 19 of a wheel 6, 7 face the flange of the other wheel 7, 6. Circumferential offsetting is provided between the teeth of the wheels, which are imbricated. Chamfered parts 21 connect each tooth 19 to its attachment part 20.

The flanges 22 each have an annular excess thickness 23. These two excess thicknesses form a core for fitting of the excitation coil 5. As a variant, the core is in a single piece, and is distinct from the flanges of the wheels 6, 7. Permanent magnets 38 can be interposed between at least some teeth 19 in order to increase the power of the alternator.

The magnets 38 are fitted in pairs.

When the rotor is magnetised, in a known manner, each tooth defines a magnetic north or south pole.

The number of slots in the body 14 of the stator 13 depends on the number of teeth 19 and on the number of windings of the coil 12.

Thus, in the case of a three-phase alternator with 12 poles, each wheel 6, 7 comprises six teeth 19 and the body 14 of the stator comprises 36 slots. In the case of a six-phase alternator or a three-phase alternator comprising two windings per phase, each polar wheel comprises six teeth and the stator body comprises 72 slots.

For a rotor with 12 teeth and an alternator of the five-phase type, the number of slots would be 60.

For a rotor with 14 teeth, the body of the three-phase stator will comprise 42 slots. The rotor can also comprise 16 poles, as in FIG. 2.

The number of slots in the body 14 thus depends on the applications.

A small air gap exists between the inner periphery of the body 14 of the stator 13 and the outer periphery of the rotor constituted by the outer periphery of the teeth 19. In this figure, the length L1 of the body 14 is shorter than the axial distance L2 between the two ends of two adjacent teeth which each belong to one of the wheels 6, 7. These ends are delimited by the chamfered parts 21. In conventional motor vehicle alternators, the outer diameter of the stator body varies between 110 and 150 mm. The outer diameter of the rotor varies between 78 mm and 112 mm. The length of the stator body varies between 26 and 42 mm. This variation of the length of the body 14 makes it possible to make the power of the machine vary. The length L1 of the body 14 depends on that of the length of the excitation coil 5. For low-power alternators, the length L1 is shorter than that of the coil 5, the ratio of the lengths being 0.8 or more. For alternators with stronger power, the length L1 is greater than that of the coil 5. In some cases this ratio is greater than 1.2, as in document EP 0539339.

This affects the length of the alternator or alternator-starter. It is therefore desirable to make the length of the lead-outs of the coil 12 such that the latter can be suitable for different lengths of stator body.

In particular, it is also desirable to be able to increase the length of the stator body 14, whilst continuing to comply with the same size determined by the length between the bases of the two bearings 15, 16.

It is also desirable to be able to decrease the length of the lead-outs when the body 14 is shorter, or has the same length, in order to reduce the quantity of material of the coil 12.

A problem then occurs, because the more the length of the lead-out is decreased, the more it is difficult for the air to pass through the lead-outs of the coil 12, which then become increasingly impermeable.

SUMMARY OF THE INVENTION

The object of the present invention is to reconcile these two contradictory requirements. According to the invention, a stator of the aforementioned type, comprising a body provided with slots, and bearing a stator winding comprising at least one winding per phase, each winding comprising:

a plurality of pairs of lateral branches which are opposite one another, and are designed to be fitted each one in a slot in the stator body;

a plurality of connection heads which extend on the exterior of, and from a first side of the stator body in order to form a first lead-out, and to connect to one another the first ends of each pair of lateral branches;

a plurality of connection feet which are offset circumferentially relative to the plurality of connection heads, and extend on the exterior of, and from a second side of the stator body in order to form a second lead-out, and to connect to one another the second ends of each pair of lateral branches, is characterised in that at least one of the pluralities of connection heads and connection feet has a generally pointed form, and in that the axial length of this plurality is between 15 and 20 mm.

An internally ventilated rotating electrical machine, in particular an alternator or an alternator-starter of a motor vehicle, is characterised in that it comprises such a polyphase stator.

By means of the invention, the resistance of the stator coil is reduced, and the air passes through the lead-outs in a manner which is satisfactory for good cooling of the stator, and in particular the winding of the latter.

A good compromise is obtained between the axial length or height of the lead-out, which has a reduced height, and the permeability of the lead-out. The air lead-out exchange surface is optimised.

The reduced height of the lead-out makes it possible to reduce the axial length of the coil, and thus the resistance of the latter. This therefore increases the efficiency of the machine, which depends on the resistance (the voltage being equal to the product of the intensity and the resistance– U=RI). The solution is also economical because the length of the coil is reduced.

It will be appreciated that the solution permits use of coiled windings in the slots in the stator body according to a polar step.

Thus, according to one embodiment, the coil is of the type which is undulating and distributed, the connection heads, the connection feet and the lateral branches being offset by a polar step.

It will be appreciated that it is also possible to increase the length of the stator body, for example that in FIG. 1, while maintaining the same size of the machine, because the axial length or height of the lead-out is reduced.

It is also possible to decrease the axial length of the stator body, since the efficiency of the machine is increased.

The solution according to the invention is highly flexible.

According to one embodiment, the two lead-outs have the characteristics according to the invention.

According to one embodiment, the two lead-outs have the same length.

According to another embodiment, the lead-outs have different lengths according to the applications.

For example, according to one embodiment, the rear lead-out is longer axially than the front lead-out.

According to one embodiment, at least one of the lead-outs has a head which is generally in the form of a symmetrical "V". This arrangement provides the best result of the compromise according to the invention between the resistance and the permeability of the coil.

According to one embodiment, the stator coil has a continuous wire.

According to one embodiment, the wire has a round cross-section for economic reasons. According to another embodiment, the wire has a cross-section which is generally rectangular, and advantageously square, for a better rate of filling of the slots.

According to one embodiment, these slots, which are of the semi-open type, have a rectangular cross-section for good arrangement of the wires.

According to one embodiment, the coil is produced with two wires in parallel, such that each wire can be introduced via the slit of the slot.

According to another embodiment, the stator coil is produced with conductive segments with a round cross-section, or as a variant with a rectangular or square cross-section.

According to one embodiment, each slot receives two layers of two conductive segments.

According to one embodiment, the coil with a continuous wire is produced turn by turn, a series of turns comprising a turn of each winding.

This arrangement makes it possible to reduce the interference between the wires or the conductive segments, as well as providing better distribution of heat at the level of the windings which are ventilated homogeneously.

All of these embodiments have characteristics which can be considered in isolation or in combination.

Other characteristics and advantages will become apparent in the light of the following description provided with reference to the attached figures.

DESCRIPTION OF EMBODIMENTS OF THE INVENTION

In the following description, elements which are identical or similar will be allocated the same reference signs, and the rear lead-out of the stator is the lead-out which is designed to be connected to the current rectifier device.

According to the invention, a compromise is sought between a height or axial length H of at least one of the lead-outs, and the permeability of this lead-out, i.e. the capacity of the lead-out to allow air to pass. This capacity is associated with the holes which are present in the lead-out. The objective is to optimise the exchange surface between at least one of the lead-outs and the air.

It should be remembered that this lead-out has a cooling function. The more the temperature of the stator is decreased, the more there is a decrease in the losses by Joule effect, and an increase in the power of the rotating electrical machine.

In addition, the more the height H of the lead-out is increased, the more the passage of the air and the cooling of the lead-out are assisted. At the same time, there is an increase in the resistance of the stator coil, and therefore in the losses.

The objective is to reduce as far as possible the height of the lead-out, whilst having good passage of air and a good heat-exchange surface. An optimal solution is therefore sought.

The polyphase stator is designed to equip an internally ventilated polyphase rotating electrical machine, such as an internally ventilated alternator or an alternator-starter, associated with a thermal engine. According to one embodiment, this thermal engine is fixed. According to another embodiment, the thermal engine is a thermal engine of a motor vehicle.

Figure 1:
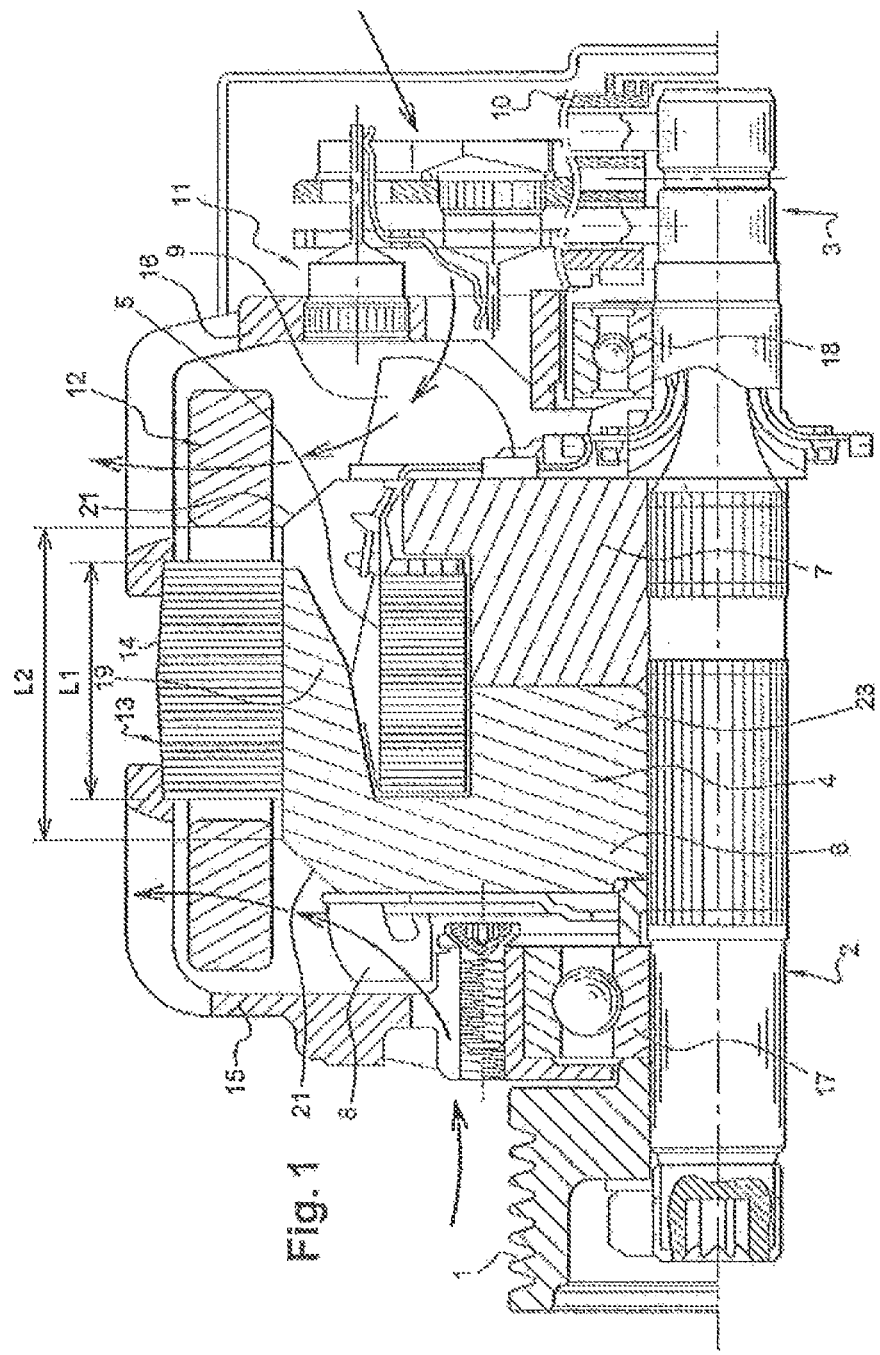
FIG. 1 is a half-view in axial cross-section of an internally ventilated polyphase alternator according to the prior art, for a motor vehicle with a thermal engine.
Figure 3:
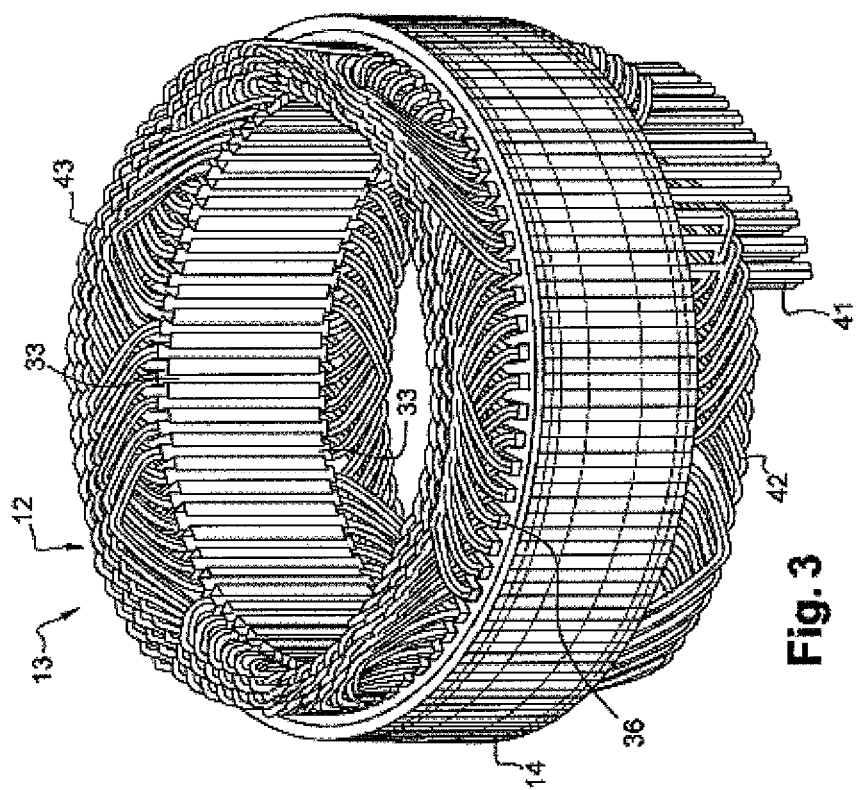
FIG. 3 is a view in perspective of a stator according to a first embodiment of the invention.

In the embodiment in FIG. 3, the stator 13 is fitted in the place and instead of the stator in FIG. 1.

Figure 4:
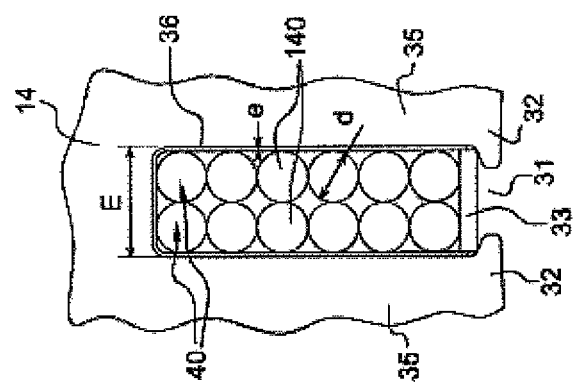
FIG. 4 is a partial view of a slot of the stator equipped with a coil according to FIG. 1.

It comprises in the above-described manner a body 14, in the form of a set of plates with slots, one of which can be seen at 30 in FIG. 4. The reference 36 designates the aforementioned slot insulation. In this embodiment, the slots 30 are oriented radially relative to the axis of rotation of the alternator constituted by the axis of the rotor shaft.

The rotor which is associated with this stator is a rotor with claws with 12 poles, at a rate of 6 poles per polar wheel.

The body 14 comprises 72 slots and the coil 12 comprises six windings.

The windings pass through the body 14 by means of the slots 30 in the latter, and extend on both sides of the body 14 in order to form a front (or first) lead-out 43 and a rear (or second) lead-out 42, which are designed to be connected to the current rectifier device in FIG. 1.

The current rectifier device comprises 12 current rectifier elements such as diodes or transistors of the MOSFET type.

According to one embodiment, the alternator or alternator-starter is of the six-phase type.

The outputs of the windings of the coil 12 are then connected in the form of a star for example.

In this case, the alternator or alternator-starter is of the three-phase type, with two windings per phase. According to one embodiment, these windings are connected in series.

As a variant they are connected in series and/or in parallel by means of switches, as described in document U.S. Pat. No. 3,793,544.

As a variant the two windings are connected in parallel.

The couplings of the windings of the phases can then be produced in star-star, triangle-star, or triangle-triangle form, as in document U.S. Pat. No. 3,793,544.

Figure 5:
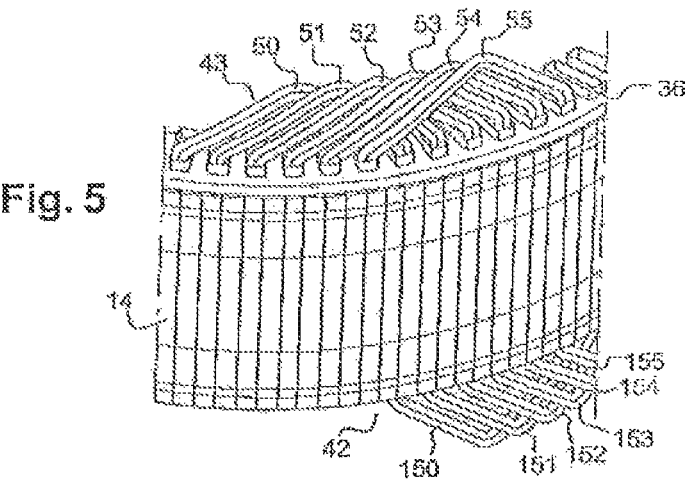
FIG. 5 is a partial view of FIG. 3 showing the body of the stator equipped with some of the windings of the coil in FIG. 3.
Figure 6:
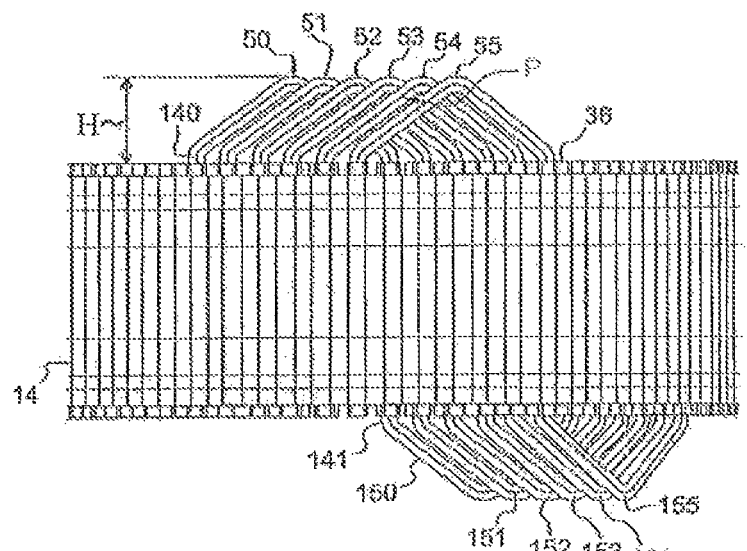
FIG. 6 is a view from the front of FIG. 5.

In FIG. 3, each winding comprises two juxtaposed continuous wires 40 extending together in parallel, each wire comprising in the above-described manner an electrical conductor, for example which is made of copper, covered by at least one insulating layer, such as enamel. As a variant, a second layer can be provided in order to render the wires 40 integral with the slot insulation 36, which extends on both sides of the body 14, as can be seen in FIGS. 3, 5 and 6, in order to protect the wires when they are inserted in the slots 30.

The presence of two continuous wires in parallel assists the production of the winding, since the wires are easier to deform than a single wire with a larger cross-section.

In FIG. 3, 24 inputs and outputs 41 can be seen, and more specifically 12 pairs of inputs and outputs, since each winding comprises two wires 40 in parallel.

This is derived from the existence of a triangle-triangle coupling in parallel of the windings.

The inputs and outputs 41 are designed to be connected to the current rectifier device. These inputs and outputs belong to the rear lead-out 42.

In this case the wires 40 have a circular cross-section.

The diameter of a wire, which in this case is made of copper, is between 1 mm and 1.50 mm, in the knowledge that in this case the wire is enamelled, and the thickness of the enamel is very slight. For example, for a copper wire 1.25 mm in diameter, the total diameter of the wire including the copper is approximately 1.35 mm.

It should be remembered that the outer diameter of the body of a motor vehicle stator varies from 110 to 150 mm, and the outer diameter of the rotor varies between 78 mm and 112 mm.

The slot insulation 36 (FIG. 4) has a slight thickness e, for example of approximately 0.1 mm, such that the width E of the slot 30 is globally equal to twice the diameter d of a wire 40.

These slots 30, which are of the semi-open type, have a generally rectangular form with two parallel lateral edges which have a generally radial orientation and a base, which are perpendicular. A retention strip, known as the yoke, exists between the base of the slot and the outer periphery of the body 14. The slots have a slit 31 at the inner periphery of the body 14. The slots 30 and the slits 31 correspond with one another. The aligned slits 31 form grooves, which in this case have axial orientation. As a variant, the grooves can be inclined in the axial direction.

The width of the slit 31 is greater than the diameter of a wire 40, but smaller than twice the diameter of a wire.

Thus, it is possible to fit the wires 40 in the slot with a minimum of play and losses of magnetic flow at the level of the slit 31.

The slots 30 are delimited by teeth 35, each plate of the body 14 comprising an alternation of teeth and slots.

The teeth 35 have a foot 32 which projects circumferentially in the direction of the adjacent tooth. The openings 31 are delimited by the feet 32.

A wedge 33 is supported on the feet 32, in the interior of the slot. Each wedge 33 extends along the entire axial length of the body 14, and has two ends which project (FIG. 3) relative to the body 14, in order to maintain the wedge in position. The wedge 33 is fine and is made of electrically insulating material, such as plastic material.

The depth or radial height of the slot 30 is a multiple of the diameter of the wire 40, increased by the thickness of the wedge 33 and the height of a foot 32, as can be seen in FIG. 4.

The wedge maintains the wires 40 in the interior of the slot, and closes the opening 31. The wires 40 are thus ultimately well-arranged in the slot, after they have been inserted radially in the latter.

The wires are aligned radially in the slots according to two radial rows, and in this case according to six layers of two wires in parallel.

The rate of filling of the slots is thus maximal, and is greater than 60%. As a variant, this rate of filling is increased by modifying the cross-section of the wires. For example as a variant, the wires have a square cross-section, the sides of which are equal to the diameter d of the wire in FIG. 1. Advantageously, the corners of the square are rounded.

As a variant, the cross-section of the wires has a rectangular, or elliptical, or another form. The six layers correspond to six revolutions or turns of the body 14.

In this FIG. 3, the coil 12, with two continuous wires 40 in parallel, is of the undulating type, and is distributed for better filling of the slots, with the wires 40 being inserted in an undulating and distributed manner in the slots 30 in the body 14, in order to carry out firstly a first revolution of the body 14 and folin a first turn, in the knowledge that one revolution of the body 14 corresponds to one turn.

Then, in the same manner, a second revolution is carried out in order to create a second turn, but in the inverse direction. The operation is repeated in this manner.

After the wires have been inserted in the slots in the body 14, it is found that, going from the exterior, at the level of the base of the slots 30 towards the interior, at the level of the wedges 33, there is a first turn comprising a turn of each winding, then a second turn in the inverse direction which is identical to the first turn, then a third turn, etc.

The turns have a circumferential length which decreases from the exterior towards the interior.

More specifically each turn, corresponding to a revolution of the body 14, comprises a succession of sequences of identical windings constituted by a turn of each winding.

The coil 12 is thus produced turn by turn, with a turn of the coil 12 comprising a turn of each winding.

This arrangement makes it possible to reduce the interference between the wires, and provides good exchange of heat, with the windings being ventilated homogeneously.

This also makes it possible to obtain a good heat-exchange surface.

Figure 7:
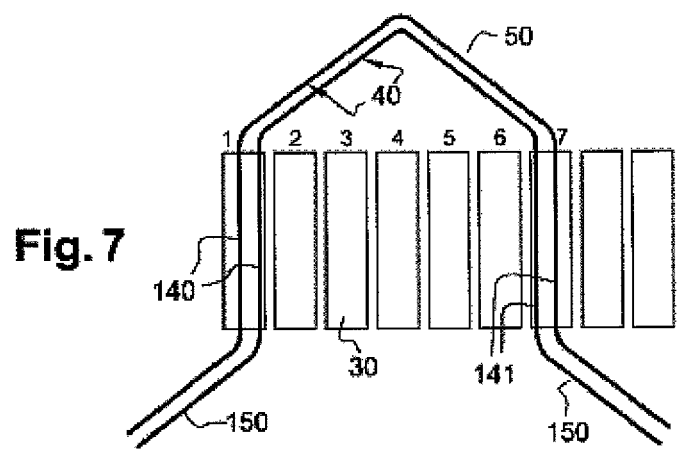
FIG. 7 is a simplified view of a section of a winding of the stator according to the invention.

FIGS. 5 and 6 show a succession of this type forming the pattern of the coil 12, with FIG. 7 representing a section of one of these windings.

In this case, each succession of the sequence comprises six windings which are supported by the body 14 of the stator, by means of the slots in the latter.

Each winding comprises:
  a plurality of pairs of first lateral branches 140 and a plurality of pairs of second lateral branches 141 (FIG. 7) which are opposite one another and are each designed to be fitted in a different slot 30 in the body 14 of the stator 13 such that each of the pairs of first and second lateral branches 140 and 141 includes two consecutive and juxtaposed wires 40;

a plurality of connection heads 50 to 55, which extend on the exterior and from a first side of the body of the stator, in order to form a first (or front) lead-out 43 and to connect the first ends of each pair of lateral branches to one another;

a plurality of connection feet 150 to 155, which are offset circumferentially relative to the plurality of connection heads 50 to 55, and extend on the exterior and from a second side of the stator body, in order to form a second (or rear) lead-out 42, and to connect to one another the second ends of each pair of lateral branches.

each of the pairs of first and second lateral branches includes two consecutive or juxtaposed wires.

Thus, each lateral branch 140, 141 is disposed in a slot which is spaced from the other slot, in this case by one polar step.

It will be appreciated that in the embodiment in FIG. 3, in which the slots 30 are oriented radially relative to the axis of the alternator, which is constituted by the axis of the rotor of the alternator, the circumferential length of a head or a foot varies according to the turn of the coil 12 to which this head or foot belongs.

Thus, the heads and feet of the outer turn of the coil 12 have a circumferential length which is greater than that of the heads and feet of the other turns of the coil 12.

FIG. 7 shows a pair of lateral branches 140, 141 which are connected at one of their ends to the connection head 50 of the first winding, and at their other end to two feet 150 of this first winding. The branch 140 can also be seen in FIG. 4, and is applicable to the other windings.

The first lateral branch 140 is for example fitted in the slot 1, and the second lateral branch 141 is fitted in the slot 7, as indicated in FIG. 7, in which the slots 30 are shown by means of rectangles. Moreover, as illustrated in FIGS. 3 and 5, the first lateral branch 140 of each of the pairs of first and second lateral branches 140, 141 occupies the same layer position in one of the slots 30 as the second lateral branch 141 of each of the pairs of first and second lateral branches 140, 141 occupies in the other of the slots 30 of the stator body 14. For example, if the first lateral branch 140 occupies a first layer position in the slot 1, then the second lateral branch 141 also occupies a first layer position in the slot 7. Similarly, if the first lateral branch 140 occupies a second layer position in the slot 1, then the second lateral branch 141 also occupies a second layer position in the slot 7.

The two wires 40 are parallel, and do not cross at the level of the heads and feet.

Figure 9:
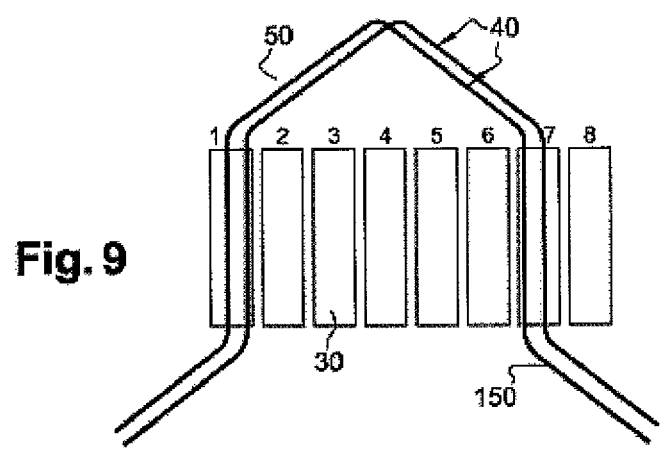
FIG. 9 is a view similar to FIG. 7, for a third embodiment of the invention.

As a variant, as can be seen in FIG. 9, the wires 40 cross at the level of the tops of the heads and feet.

Between these two slots there are five other slots, each of which is occupied respectively by one of the lateral branches of the second winding with the head 51 and the foot 151, for connection to the third winding with the head 52 and foot 152, etc. The step between the slots 1 and 7 is equal to the polar step.

Thus, the branches 140, 141 are spaced circumferentially from one another by one polar step.

The heads and feet of each winding are offset, i.e. spaced, circumferentially, by one polar step.

Thus, in the front lead-out 43, the heads 50 to 55 of a succession of sequences are not aligned radially, but are offset circumferentially from one another, such that they permit circulation of the cooling air.

Similarly, in this embodiment, in the rear lead-out 42, the feet 150 to 155 of a succession of sequences are not aligned radially, but are offset circumferentially from one another, such that they permit circulation of the cooling air.

This configuration of successions of sequences turn by turn makes it possible to reduce the interference between the wires, and provides improved exchange of heat, since the windings are ventilated homogenously.

According to one characteristic, at least one of the pluralities of connection heads and connection feet has a generally pointed form, and the axial length of this plurality is between 15 and 20 mm.

The top of this pointed form is rounded.

This pointed form is slightly curved as a result of the connections which are formed with lateral branches which belong to different slots, and since one turn of the coil 12 comprises a succession of turns of the windings.

Figure 8:
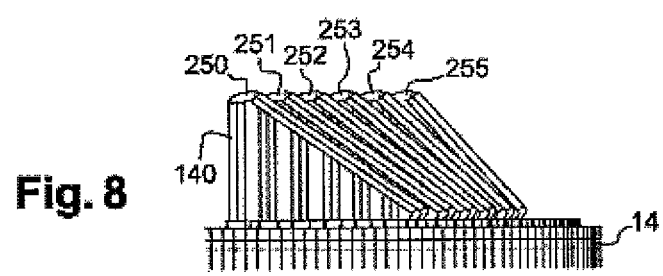
FIG. 8 is a partial view similar to FIG. 6, for a second embodiment of the invention.

According to one embodiment, the pointed form, as can be seen in FIG. 8, is constituted by an axially oriented part which extends one of the branches 140, 141, and by an inclined part which connects the top of the point to the other lateral branch. This inclined part is slightly curved. In this FIG. 8, the heads 50 to 55 in FIGS. 5 and 6 are modified, and bear the references 250 to 255, the branch 140 being extended in order to form one of the sides of the pointed form with a rounded top.

According to another embodiment, the pointed form comprises two parts which are inclined in the inverse direction, each part being connected to one of the lateral branches and to the other inclined part. According to one embodiment, the inclination of the parts is different, such that the pointed form is generally in the shape of a non-symmetrical "V".

As a variant, the point is generally in the form of a symmetrical "V", as can be seen in FIGS. 3, 5, 6 and 7. The top of the "V" is rounded, as are the areas of connection of the branches of the "V" to the lateral branches. The "V" is centred. This "V" is also slightly curved circumferentially: this is the arrangement which provides the best result.

In the variants previously described, the pointed form thus constitutes two sides of a triangle with a rounded top, the third side of the triangle being generally delimited by the body, as can be seen in FIGS. 6 and 8.

According to one embodiment, the diameter of a wire 40 is between 1 mm and 1.7 mm.

Figure 10:
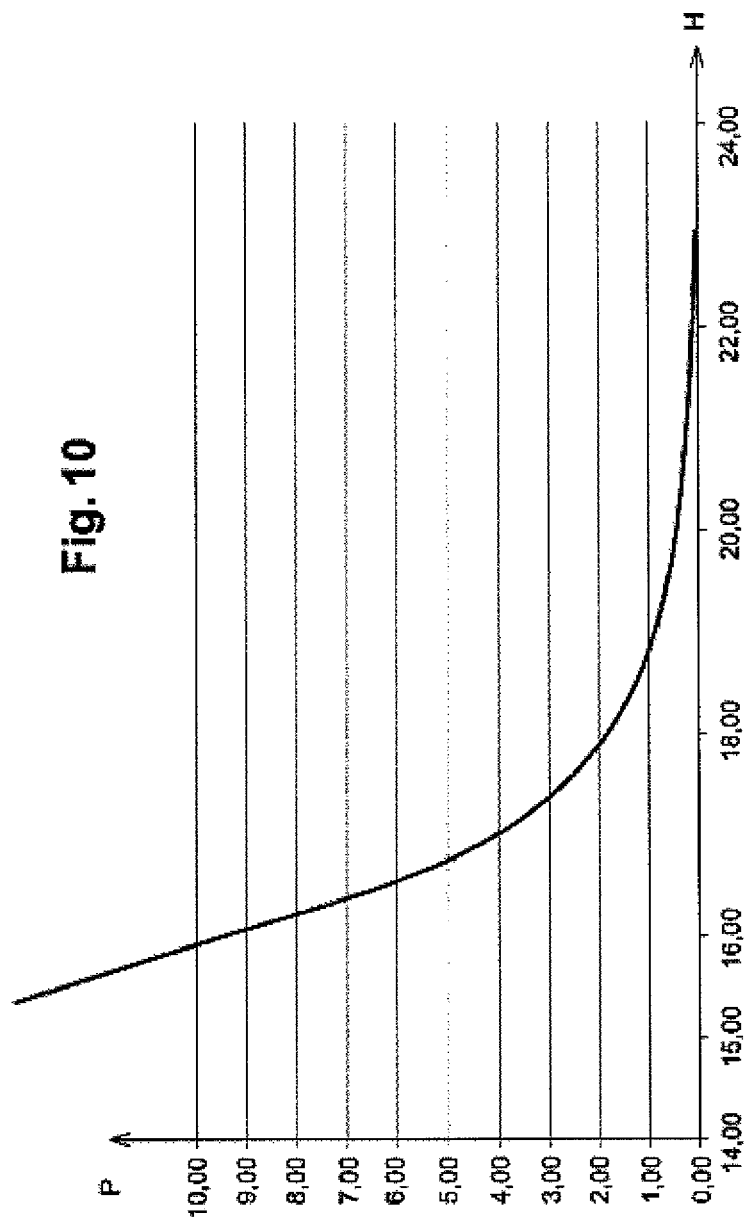
FIG. 10 is a diagram showing the characteristic curve of the permeability according to the height of a lead-out, and thus of the heat-exchange surface.

With reference to FIG. 3 and FIG. 10, it can be seen that the more the axial length (or height) H of the lead-out is reduced, the more the lead-out is densified.

More specifically, since the outer diameter of the stator body 14 is between 110 and 150 mm, with the generally symmetrical pattern in FIGS. 5 and 6, it is found that, for a height H of lead-out of 14 mm, interference begins to appear between the wires 40 of the feet 150 to 155 or of the heads 50 to 55, and the ventilation of the lead-out is reduced to a minimum, or is even non-existent. The resistance of the coil 12 is minimal.

For a lead-out height of 20 mm, the ventilation of the lead-out is increased without interference between the wires, but the limit is obtained from the point of view of the electrical resistance of the lead-out.

For an outer diameter of the body 14 of between 130 mm and 150 mm, it is found that the optimal value of the lead-out height H is generally 17 mm, the length of the body 14 being between 30 and 42 mm. Good ventilation is obtained without interference between the wires, whilst having a good value of resistance of the coil 12. The heat-exchange surface is good, and is better than for lead-outs with a shorter height H.

More particularly, with reference to FIGS. 5 and 6, it can be seen that the pairs of wires are well-spaced relative to one another, the distance being indicated by the arrow P in FIG. 6.

The more the height of the lead-out is reduced, the closer the pairs of wires are brought to one another. The more the height of the lead-out is increased, the more the pairs of wires are spaced from one another.

FIG. 10 shows on the X-axis the height H of the lead-out concerned in mm, and on the Y-axis the permeability, with the index 10 corresponding to very great impermeability, and the index 0 corresponding to the maximum permeability (maximum passage of air). As shown by the curve in FIG. 7, for a lead-out with a height H of 14 mm, interference between the wires begins to occur, and the ventilation of the lead-out is reduced to the minimum. The curve shown therefore represents the temperature according to the height H of the lead-out and the permeability.

Below H=14 mm, very poor results are obtained from the point of view of ventilation, and therefore of temperature, since a wall exists, but the resistance of the lead-out is reduced. For a value of H=15 mm, there is definite passage of air, and the resistance of the coil is low. The more the height of the lead-out is increased, the better the passage of air, but the resistance of the coil is also increased.

For a value of the lead-out height H greater than 20 mm, virtually no gain is achieved in terms of ventilation, and therefore of temperature.

It will be appreciated that the present invention is not limited to the embodiments described. Thus, the coil can be undulated in a simple manner. A spiral coil is produced, the turns having a circumferential length which decreases from the exterior towards the interior.

As a variant, the slots 30 are initially open, then, after insertion of the wires, they are partly closed for formation of slots of the semi-closed type.

This is carried out by deforming the inner ends of the teeth. For example, each tooth has at each of its ends two tongues which are initially oriented radially, and are folded circumferentially after insertion of the wires, in order to form the feet 32.

It will be appreciated that the coils 12 can have irregularities at the level of certain slots, in particular at the level of the intakes and outputs 41.

The wires 40 can be formed in the areas of these wires which cross other wires. For example, the wires are deformed locally, bent or twisted.

As a variant, the number of windings is other than six.

These windings are arranged as in FIG. 3, in order to be coiled turn by turn.

For example as a variant, five windings are provided, and therefore two rows of five wires in the slots. The number of diodes or transistors of the rectifying device is then ten.

This current rectifying device can have any configuration, depending on the applications. It need not be supported by the rear bearing of the alternator, but for example by a mezzanine, as described for example in document WO 2004/040738. As a variant it is offset.

Similarly, the number of teeth of each polar wheel depends on the applications, and may vary from 6 to 8 in the aforementioned manner.

One of the bearings 15, 16 of the alternator can be cooled by circulation of a fluid, and the other one can be ventilated. As a variant, the alternator can have no brush.

As a variant, two rows of two wires are provided in the slots, as described for example in document WO 92/06527.

Figure 2:
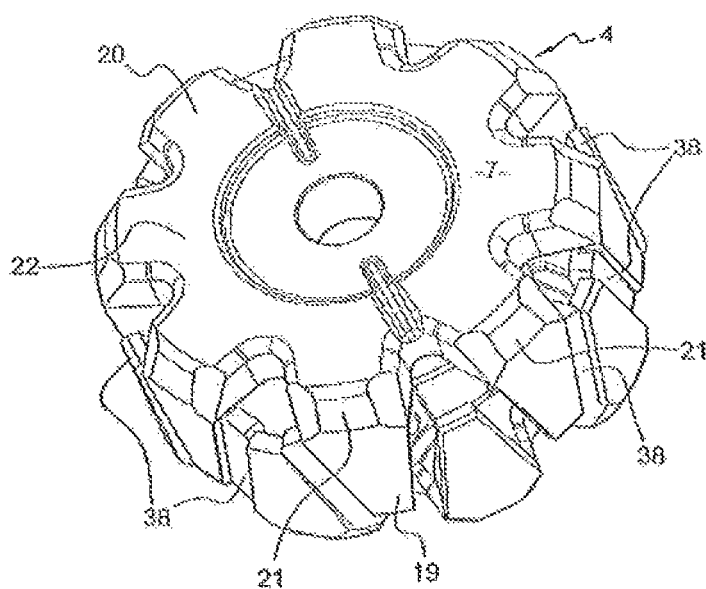
FIG. 2 is a view in perspective of a rotor with claws according to the prior art, equipped with permanent magnets.

With reference for example to FIG. 2 of the latter, it can be seen that, as a variant, the stator coil consists of conductive segments in the foul). of pins with continuous heads, and feet in two parts, which are connected to one another for example by being welded.

In FIG. 3, the heads or feet can be in two parts, each belonging to a conductive segment.

As a variant, only one of the lead-outs has dimensional characteristics according to the invention.

According to one embodiment, the lead-outs 42, 43 have an identical axial length. As a variant, the lengths of the lead-outs 42, 43 are different. For example, as a variant, the rear lead-out 42 is longer than the front lead-out 43.

However, the two lead-outs 42, 43 can comply with the characteristics of length according to the invention.

For example, the rear lead-out 42 can have a length close to 20 mm, whereas the front lead-out 43 has a length close to 17 mm, thus being less permeable than the rear lead-out 42. The inverse is possible.

As a variant, the rotor has projecting poles, and as a variant can comprise peimanent magnets as in document WO 02/054566.

The invention claimed is:

1. A polyphase stator for an internally ventilated rotating electrical machine, such as an alternator or alternator-starter of a motor vehicle, the polyphase stator comprising a stator body (14) provided with slots (30) and bearing a stator coil (12) comprising at least one winding per phase, the at least one winding comprising:
   a plurality of pairs of first and second lateral branches (140, 141) which are opposite one another, each one of the pairs of first lateral branches fitted in one of the slots (30) in the body (14) of the stator (13) and each of the pairs of second lateral branches is fitted in the other of the slots spaced from the one of the slots in the body (14);
   a plurality of connection heads (50 to 55) which extend on the exterior of, and from a first side of the stator body in order to form a first lead-out (43), and to connect to one another first ends of each of the pairs of first and second lateral branches;
   a plurality of connection feet (150 to 155) which are offset circumferentially relative to the plurality of connection heads, and extend on the exterior of, and from a second side of the stator body in order to form a second lead-out (42), and to connect to one another second ends of each of the pairs of lateral branches;
   at least one of the plurality of connection heads and the plurality of connection feet has a generally pointed form;
   an axial length of the at least one of the plurality of connection heads and the plurality of connection feet is between 15 and 20 mm;
   an outer diameter of the stator body (14) is between 110 and 150 mm;
   the at least one winding comprising two juxtaposed continuous wires extending together in parallel.

2. The stator according to claim 1, wherein each of the plurality of connection heads and the plurality of connection feet has a generally pointed form, and wherein the axial length of each of the plurality of connection heads and the plurality of connection feet is between 15 and 20 mm.

3. The stator according to claim 1, wherein the plurality of connection heads has a length which is identical to a length of the plurality of connection feet.

4. The stator according to claim 1, wherein the plurality of connection heads has a length which is different from a length of the plurality of connection feet.

5. The stator according to claim 1, wherein at least one of the plurality of connection heads and the plurality of connection feet has a form which is generally in the shape of a symmetrical "V".

6. The stator according to claim 1, wherein the lateral branches (140, 141) are fitted in the slots (30) which are spaced from one another circumferentially by one polar step.

7. The stator according to claim 6, wherein the heads and feet of the windings are offset circumferentially by one polar step.

8. The stator according to claim 1, wherein the coil (12) comprises at least one lead-out (42, 43) comprising a succession of windings which are offset in the circumferential direction, and have an identical sequence.

9. The stator according to claim 1, wherein the slots (30) have a generally rectangular form.

10. The stator according to claim 1, wherein the wires are round wires.

11. The stator according to claim 10, wherein the one of the slots has a circumferential width equal to at least two wire diameters.

12. The stator according to claim 1, wherein the wires are wires with a generally rectangular form.

13. The stator according to claim 1, wherein the stator comprises 72 slots and 6 windings.

14. The stator according to claim 1, wherein at least one of the plurality of connection heads and the plurality of connection feet has a form which is generally in the shape of a non-symmetrical "V".

15. An internally ventilated rotating electrical machine, in particular an alternator or alternator-starter for a motor vehicle, the rotating electrical machine comprising a polyphase stator, the polyphase stator comprising a stator body (14) provided with slots (30) and bearing a stator coil (12) comprising at least one winding per phase, the at least one winding comprising:
    a plurality of pairs of first and second lateral branches (140, 141) which are opposite one another, each one of the pairs of first lateral branches fitted in one of the slots (30) in the body (14) of the stator (13) and each of the pairs of second lateral branches is fitted in the other of the slots spaced from the one of the slots in the body (14);
    a plurality of connection heads (50 to 55) which extend on the exterior of, and from a first side of the stator body in order to form a first lead-out (43), and to connect to one another first ends of each of the pairs of first and second lateral branches;
    a plurality of connection feet (150 to 155) which are offset circumferentially relative to the plurality of connection heads, and extend on the exterior of, and from a second side of the stator body in order to form a second lead-out (42), and to connect to one another second ends of each of the pairs of lateral branches;
    at least one of the plurality of connection heads and the plurality of connection feet has a generally pointed form;
    an axial length of the at least one of the plurality of connection heads and the plurality of connection feet is between 15 and 20 mm;
    an outer diameter of the stator body (14) is between 110 and 150 mm;
    the at least one winding comprising two juxtaposed continuous wires extending together in parallel.

16. A polyphase stator for an internally ventilated rotating electrical machine, such as an alternator or alternator-starter of a motor vehicle, the polyphase stator comprising a stator body (14) provided with slots (30) and bearing a stator coil (12) comprising at least one winding per phase, the at least one winding comprising:
    a plurality of pairs of first and second lateral branches (140, 141) which are opposite one another, each one of the pairs of first lateral branches fitted in one of the slots (30) in the body (14) of the stator (13) and each of the pairs of second lateral branches is fitted in the other of the slots spaced from the one of the slots in the body (14);
    a plurality of connection heads (50 to 55) which extend on the exterior of, and from a first side of the stator body in order to form a first lead-out (43), and to connect to one another first ends of each of the pairs of first and second lateral branches;
    a plurality of connection feet (150 to 155) which are offset circumferentially relative to the plurality of connection heads, and extend on the exterior of, and from a second side of the stator body in order to form a second lead-out (42), and to connect to one another second ends of each of the pairs of lateral branches;
    at least one of the plurality of connection heads and the plurality of connection feet has a generally pointed form;
    an axial length of the at least one of the plurality of connection heads and the plurality of connection feet is between 15 and 20 mm;
    an outer diameter of the stator body (14) is between 110 and 150 mm;
    the at least one winding comprising two continuous wires in parallel;
    the first lateral branch of each of the pairs of first and second lateral branches occupies the same layer position in one of the slots (30) as the second lateral branch of each of the pairs of first and second lateral branches occupies in the other of the slots (30) of the stator body (14).

17. The stator according to claim 16, wherein each of the plurality of connection heads and the plurality of connection feet has a generally pointed form, and wherein the axial length of each of the plurality of connection heads and the plurality of connection feet is between 15 and 20 mm.

18. The stator according to claim 16, wherein the plurality of connection heads has a length which is identical to a length of the plurality of connection feet.

19. The stator according to claim 16, wherein the plurality of connection heads has a length which is different from a length of the plurality of connection feet.

20. The stator according to claim 16, wherein the coil (12) comprises at least one lead-out (42, 43) comprising a succession of windings which are offset in the circumferential direction, and have an identical sequence.

* * * * *